July 30, 1963 H. E. FORSHA ETAL 3,099,784
FREQUENCY MULTIPLIER
Filed Dec. 31, 1959
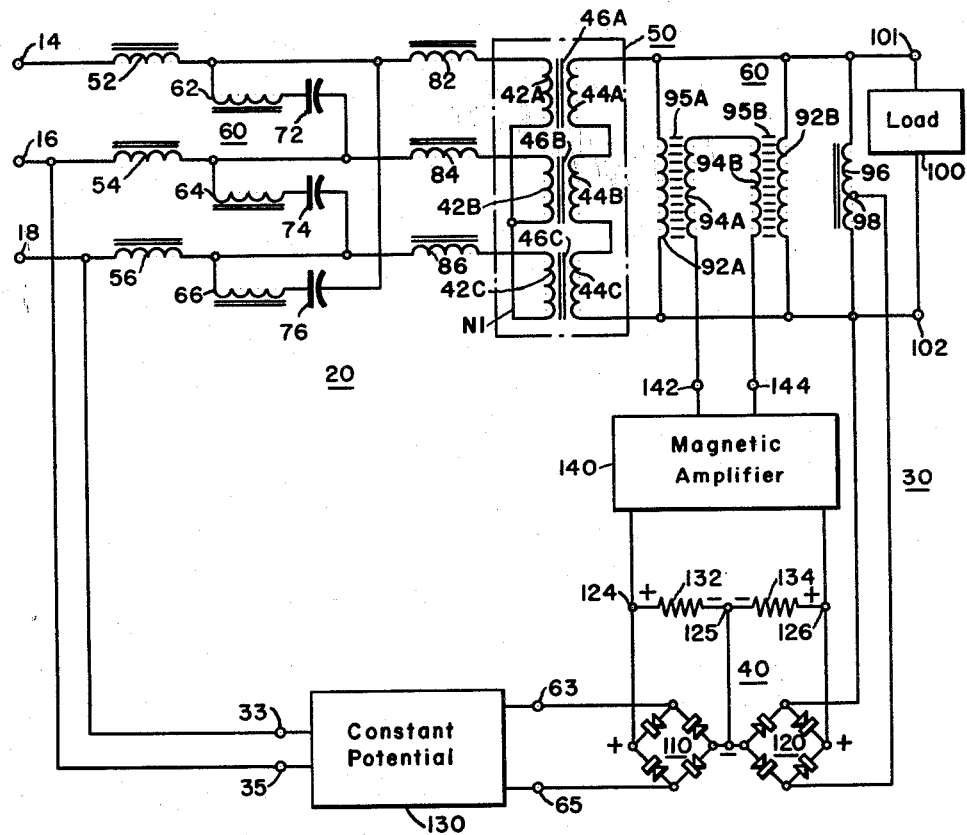
WITNESSES
Wm. B. Sellers.
Clement L. McHale
INVENTORS
Herbert E. Forsha and
Sidney M. Kapell
BY
A. T. Stratton
ATTORNEY United States Patent Office 3,099,784
Patented July 30, 1963

3,099,784
FREQUENCY MULTIPLIER
Herbert E. Forsha, Sharon, and Sidney M. Kapell, Prospect Park, Pa., assignors to Westinghouse Electric Corporation, East Pittsburgh, Pa., a corporation of Pennsylvania
Filed Dec. 31, 1959, Ser. No. 863,248
6 Claims. (Cl. 321—7)

This invention relates to frequency multipliers for converting three-phase alternating current having a given or predetermined frequency into single-phase alternating current having a frequency three times the input frequency and particularly to electrical control apparatus, such as regulator systems, for maintaining the output voltage of such multipliers at substantially a predetermined value.

In the application of certain types of electrical apparatus, it is desirable to provide alternating current at a frequency which is higher than that of a conventional electrical power system, which is usually 50 or 60 cycles. For example, the output of an ozone generator increases with the frequency of the alternating current supplied thereto. One well-known type of frequency multiplier which has been employed in the past for converting three-phase alternating current of a predetermined frequency into single-phase alternating current having a frequency three times said predetermined frequency employs a transformer having three primary phase windings which are Y connected to a source of three-phase alternating current and three secondary phase windings which are connected in series circuit relation with one another or in an open delta arrangement to a load circuit to provide single-phase alternating current of a frequency three times the frequency of the alternating current from said source. The latter type of frequency multiplier has been found to have certain disadvantages with respect to efficiency, voltage fluctuations, and power factor, particularly in applications where the load is normally of a leading power factor type which may vary during operation, such as an ozone generator. It is, therefore, desirable to provide an improved frequency multiplier of the type described having more desirable operating characteristics, particularly with respect to efficiency, voltage fluctuations and power factor, especially where the load being supplied is normally of a leading power factor type which may vary during operation.

It is an object of this invention to provide a new and improved static frequency multiplier for converting three-phase alternating current of a predetermined frequency to single-phase alternating current of a frequency three times said predetermined frequency.

Another object of this invention is to provide an improved electrical control apparatus for varying the output voltage of a static frequency multiplier which is adapted to convert three-phase alternating current of a given frequency to single-phase alternating current of a frequency three times the input frequency.

A further object of this invention is to provide a new and improved regulator system for maintaining at substantially a predetermined value the output voltage of a frequency multiplier for converting three-phase alternating current of a predetermined frequency to single-phase alternating current of a frequency three times said predetermined frequency.

Other objects of the invention will, in part, be obvious and will, in part, appear hereinafter.

For a fuller understanding of the nature and objects of the invention, reference should be had to the following detailed description taken in connection with the accompanying drawing, in which the single FIGURE diagrammatically illustrates one embodiment of this invention.

Referring now to the drawing, there is illustrated a frequency multiplying circuit 20 which embodies the teachings of this invention for converting alternating current from a three-phase source of alternating current having a first predetermined frequency as indicated at the input terminals 14, 16 and 18 to single-phase alternating current having a frequency three times said first frequency which is supplied to a load circuit, which includes the load 100 at the output or load terminals 101 and 102. In order to maintain the output voltage of the frequency multiplier 20 at the output or load terminals 101 and 102 at substantially a predetermined value and the effective power factor of the load 100 substantially within a predetermined operating range, the regulator system 30, which includes the saturable reactor or saturable inductive device 60, the magnetic amplifier 140 and the error detecting circuit 40, is connected in circuit relation with the output or load terminals 101 and 102.

In particular, the frequency multiplier or tripler 20 includes the transformer 50 having three primary phase windings 42A, 42B and 42C and three associated secondary phase windings 44A, 44B and 44C, respectively, which are disposed on the magnetic core structures 46A, 46B and 46C, respectively, which may be combined in a common structure in a particular application. The three primary phase windings 42A, 42B and 42C of the transformer 50 are connected in a star or Y arrangement with a neutral connection indicated at N1, to be energized from the three-phase alternating current source terminals 14, 16 and 18, respectively, through the current limiting and buffer reactors 52 and 82, 54 and 84, and 56 and 86, respectively. The three secondary phase windings 44A, 44B and 44C of the transformer 50 are connected in series circuit relation with one aanother to provide a single-phase alternating current output voltage at the load terminals 101 and 102, the series circuit which includes said three secondary phase windings being connected across the load circuit which includes the load 100. The latter circuit arrangement of the secondary phase windings 44A, 44B and 44C may also be described as an open delta arrangement with the open corner of the delta connection at the load terminals 101 and 102 being connected to the load circuit which includes the load 100.

The current limiting and buffer reactors 52 and 82, respectively, are connected in series circuit relation with one another and with the primary phase winding 42A of the transformer 50, the series circuit being connected between the neutral terminal or connection N1 and the source terminal or conductor 14. Similarly, the current limiting and buffer inductive reactors 54 and 84, respectively, are connected in series circuit relation within one another and with the primary phase winding 42B between the source phase conductor or terminal 16 and the neutral connection N1 while the current limiting and buffer inductive reactors, 56 and 86, respectively, are connected in series circuit relation with one another and with the primary phase winding 42C, the series circuit being connected between the source conductor or terminal 18 and the neutral terminal or connection N1.

The current limiting reactors 52, 54 and 56 are provided to limit the in-rush current through the associated primary phase windings 42A, 42B and 42C, respectively, when said primary phase windings are excited or energized initially from the three-phase alternating current source indicated at the terminals 14, 16 and 18, respectively, and to permit across-the-line starting of the frequency multiplier 20 without the run-away action which might otherwise result during the initial operating period after said multiplier is energized. The current limiting inductive reactors 52, 54 and 56 must be provided where the impedance or reactance of the alternating current source at the input terminals 14, 16 and 18 is lower than desired to limit the in-rush currents which flow through the windings of the transformer within allowable safe limits.

The buffer reactors 82, 84 and 86 are provided to effectively isolate the three primary phase windings 42A, 42B and 42C of the transformer 50 from the three-phase circuit means 60. The buffer reactors 82, 84 and 86 operatively control and limit the flow of harmonic currents between the three-phase circuit means 60 and the primary phase windings 42A, 42B and 42C of the transformer 50.

In order to compensate for the low lagging power factor of the transformer 50 when considered as a load viewed from the source terminals 14, 16 and 18, respectively, the three-phase circuit means 60 is provided. In general, the three-phase circuit means 60 is connected in circuit relation between the buffer reactors 82, 84 and 86 and the associated primary phase windings 42A, 42B and 42C, respectively, of the transformer 50 and the source terminals 14, 16 and 18, respectively, in a delta arrangement. The three phases of the circuit means 60 include the compensating capacitors 72, 74 and 76 which are each connected in series circuit relation with the associated inductive reactors 62, 64 and 66, respectively. The first phase of the circuit means 60 which includes the inductive reactor 62 and the capacitor 72 connected in series circuit relationship is connected between the common terminal between the current limiting and buffer reactors 52 and 82, respectively, and the common terminal between the current limiting and buffer reactors 54 and 84, respectively. Similarly, the second phase of the circuit means 60 which includes the inductive reactor 64 and the capacitor 74 connected in series circuit relationship is connected between the common terminal between current limiting and buffer reactors 54 and 84, respectively, and the common terminal between the current limiting and buffer reactors 56 and 86, respectively, while the third phase of the circuit means 60 which includes the inductive reactor 66 and the capacitor 76 connected in series circuit relation is connected between the common terminal between the current limiting and buffer reactors 56 and 86, respectively, and the common terminal between the current limiting and buffer reactors 52 and 82, respectively.

In order to prevent overloading of the compensating capacitors 72, 74 and 76 of the circuit means 60 during the operation of the frequency multiplier 20 when higher harmonic frequencies, particularly the fifth and seventh harmonic frequencies of the input frequency at the source terminals 14, 16 and 18 result, the resonant frequency of each phase of the circuit means 60 is arranged or selected to be greater than the output frequency of the frequency multiplier 20, which in this case is three times the input frequency of the alternating current from the three phase source at the terminals 14, 16 and 18. Preferably, the resonant frequency of the phase of the circuit means 60 is selected to be slightly less than the fifth harmonic of the input frequency of the alternating current at the source terminals 14, 16 and 18. For example, the series resonant frequency of the capacitor 72 in combination with its associated inductor reactor 62 is arranged to be greater than the output frequency of the frequency multiplier 20 or greater than three times the input frequency of the alternating current at the source terminals 14, 16 and 18 in order that the impedance of each phase of the circuit means 60 be higher at the higher frequency harmonics to thereby prevent the overloading of the capacitors 72, 74 and 76 during the operation of the frequency multiplier 20. The power factor compensation provided by the capacitors 72, 74 and 76 of the circuit means 60, therefore, need only be adequate to provide compensation at the fundamental frequency of the alternating current at the terminals 14, 16 and 18 since the overloading of said capacitors by the higher harmonic frequencies of the input frequency is prevented by the associated inductive reactors 62, 64 and 66, respectively.

In order to at least partially compensate for the power factor of the load 100 when said load is of a leading power factor type, the fixed inductive reactor 96, having a tap connection 98 whose purpose will be explained hereinafter, is connected in parallel circuit relationship with the load 100 between the terminals 101 and 102 across the output of the series circuit which includes the three secondary phase windings 44A, 44B and 44C of the transformer 50. In certain applications where the load 100 is of a lagging power factor type, the fixed inductive reactor 96 may be replaced by a fixed capacitive reactance or capacitor to make the load 100 as viewed from the three secondary phase windings 44A, 44B and 44C of the transformer 50 effectively appear to be of a leading power factor type.

In the operation of the frequency multiplier 20 the alternating current voltage at the source terminals 14, 16 and 18 is increased until the magnetic cores 46A, 46B and 46C of the transformer 50 are operating at least at times well above the knee of the saturation curve of each of said magnetic cores, as disclosed in greater detail in U.S. Patent 1,157,730, issued October 26, 1915, to F. Spinelli and in the magazine article "Frequency-Changing at Supply Frequencies by Static Means," by F. Brailsford, which appeared in the Journal of the Institute of Electrical Engineers, volume 73, page 309, in 1933. When the latter operating condition is present, the output frequency of the frequency multiplier 20 which appears at the output of load terminals 101 and 102 across the secondary phase windings 44A, 44B and 44C of the transformer 50 will be three times the frequency of the alternating current supplied at the source terminals 14, 16 and 18. Because of the high magnetic flux densities at which the magnetic cores 46A, 46B and 46C of the transformer 50 are operated, the output voltage of the higher frequency alternating current which appears at the output or load terminals 101 and 102 is subjected to wide fluctuations in magnitude for small changes or increments in the magnitude of the alternating current voltage at the source terminals 14, 16 and 18.

As mentioned previously, the regulator system 30 is provided in order to maintain at substantially a predetermined value the output voltage of the frequency multiplier 20 which appears at the output or load terminals 101 and 102 across the load circuit which includes the load 100. In general, the regulator system 30 employs an error detecting circuit 40, which may be of any conventional type, for comparing the output voltage of the frequency multiplier 20 at the terminals 101 and 102 with a substantially constant potential or reference voltage to obtain an error or difference signal which is then amplified by the magnetic amplifier 140 and applied to the saturable reactor or saturable inductor device 60 which is effectively connected in parallel circuit relation with the load 100 to vary the effective impedance of said saturable reactor and to thereby maintain the voltage across the load 100 at the terminals 101 and 102 at substantially a predetermined value.

In this instance, the error detecting circuit 40 comprises means for providing a substantially constant potential or reference voltage, more specifically, the constant potential device 130 and maens for obtaining a measure of the output voltage of the frequency multiplier 20 at the terminals 101 and 102, more specifically, the tap connection 98 on the fixed inductive reactor 96. The input terminals of the constant potential device 130 are connected to be responsive to the source terminals 16 and 18, respectively, and produces at its output terminals 63 and 65 a substantially constant alternating current potential irrespective of the magnitude of the voltage at the source terminals 16 and 18 to which said device is connected. The substantially constant output potential of the constant potential device 130 at the output terminals 63 and 65 is applied to the input terminals of the full wave rectifier 110 to which said output terminals are connected. The substantially constant unidirectional or direct-current output voltage at the output terminals of the full wave rectifier 110 is then applied across the resistor 132 at the terminals 124 and 125 to which the output terminals of the full wave rectifier 110 are connected. In order to obtain a measure of the output voltage of the frequency multiplier 20 at the output terminals 101 and 102, the output terminal 102 and the tap connection 98 of the fixed inductive reactor 96, which functions in this respect as an autotransformer, are connected across the input terminals of the full wave rectifier 120 which produces at its output terminals a unidirectional or direct-current voltage which is responsive to or varies with the output voltage of the frequency multiplier 20 at the output terminals 101 and 102. The output voltage of the full wave rectifier 120 is applied across the resistor 134 at the terminals 125 and 126 to which the output terminals of the full wave rectifier 120 are connected so that the voltage across the resistor 134 varies with the output voltage of the frequency multiplier 20 at the output terminals 101 and 102. The resistors 132 and 134 are connected as mixing resistors in series circuit relation with one another between the terminals 124 and 126 with the unidirectional or direct-current voltages across said resistors arranged to be opposing with respect to one another to obtain an output error or difference signal which is a measure of the deviation of the output voltage of the frequency multiplier 20 at the terminals 101 and 102 from substantially a predetermined regulated value. The common terminal 125 between the mixing resistors 132 and 134 is connected to the negative output terminal of each of the full wave rectifiers 110 and 120.

In the operation of the error detecting circuit 40, the direct-current output voltage of the full wave rectifier 110 which appears across the mixing resistor 132 is, therefore, a substantially constant potential or reference voltage while the direct-current voltage at the output of the full wave rectifier 120 which appears across the resistor 134 and opposes the voltage across the resistor 132 is a direct-current measure of the output voltage of the frequency multiplier 20 at the terminals 101 and 102. The magnitude and polarity of the output error or difference signal or voltage of the error detecting circuit 40 which appears at the terminals 124 and 126 will depend upon whether the output voltage of the frequency multiplier 20 at the terminals 101 and 102 is above or below substantially a predetermined desired regulated value of output voltage. It is to be understood that in certain applications the comparing of the output voltage of the frequency multiplier 20 with a substantially constant potential or reference voltage may be accomplished magnetically by applying a reference potential to one of the windings of a magnetic device, such as a magnetic amplifier, while a measure of the output voltage of the frequency multiplier 20 is applied to a different winding of the same magnetic device.

The magnetic amplifier 140, which may be of the push-pull type, is connected in circuit relation between the error detecting circuit 40 and the saturable reactor 60 to be responsive to the output error or difference signal from the error detecting circuit 40 and to control the operation of the saturable reactor 60 in accordance with said error or difference signal. In particular, the input of the magnetic amplifier 140 is connected across the output terminals 124 and 126 of the error detecting circuit 40 to produce at the output terminals 142 and 144 of the magnetic amplifier 140 an amplified signal which is of the unidirectional or direct-current type and which varies with the output error or difference signal from the error detecting circuit 40 and, in turn, with the output voltage of the frequency multiplier 20 at the output terminals 101 and 102.

In general, the saturable reactor 60 is connected in circuit relation between the magnetic amplifier 140 and the output terminals 101 and 102 of the frequency multiplier 20 to vary the effective impedance or reactance across the output terminals 101 and 102 in accordance with the output signal of the magnetic amplifier 140 and, in turn, with the output error or difference signal from the error detecting circuit 40 which varies with the output voltage of the magnetic amplifier 20 at the terminals 101 and 102 in order to maintain the output voltage of the frequency multiplier 20 at the terminals 101 and 102 at substantially a predetermined value.

In particular, the saturable reactor or saturable inductor device 60 comprises the first and second load winding sections 92A and 92B, respectively, and the associated first and second control winding sections 94A and 94B, respectively, which are inductively disposed on the saturable magnetic cores 95A and 95B, respectively, as shown in the drawing. The first and second load winding sections 92A and 92B, respectively, are connected in parallel circuit relation with one another across the output terminals 101 and 102 of the frequency multiplier 20 and also in parallel circuit relation with the load circuit which includes the load 100 while the first and second control winding sections 94A and 94B of the saturable reactor 60 are connected in series circuit relation with one another, the series circuit being connected across the output terminals 142 and 144 of the magnetic amplifier 140 to be responsive to the output signal of said magnetic amplifier. The first and second control winding sections 94A and 94B, respectively, of the saturable reactor 60 are disposed on the associated saturable magnetic cores 95A and 95B so that the alternating current voltages induced in said control winding sections when current flows in the associated load winding sections 92A and 92B are substantially equal and opposing to prevent any interference with the operation of the magnetic amplifier 140 whose output terminals 142 and 144 are connected across said control winding sections. The effective reactance or impedance of the saturable reactor 60 which is introduced in parallel circuit relation with the load 100 across the output terminals 101 and 102 varies with the unidirectional or direct-current control signal which appears at the output terminals 142 and 144 of the magnetic amplifier 140 and which flows through the first and second control winding sections 94A and 94B of the saturable reactor 60.

The overall operation of the regulator system 30 will now be considered. When the magnitude of the output voltage of the frequency multiplier 20 which appears at the output terminals 101 and 102 increases to a value above its regulated value, a corresponding change in the direct-current voltage across the resistor 134 of the error detecting circuit 40 results which causes a corresponding change in the magnitude of the direct-current error signal or voltage which appears at the output terminals 124 and 126 of the error detecting circuit 40. The latter change in the output signal of the error detecting circuit 40 is in such a direction as to increase the output signal or current of the magnetic amplifier 140 which appears at the output terminals 142 and 144 and which is applied to the first and second control windings 94A and 94B of the saturable reactor 60 to thereby decrease the effective reactance or impedance of the saturable reactor 60 and reduce the output voltage of the frequency multiplier 20 to its regulated value.

On the other hand, a decrease in the output voltage of the frequency multiplier 20 which appears at the output terminals 101 and 102 causes a corresponding change in the voltage across the resistor 134 of the error detecting circuit 40 and a corresponding change in the output error signal or voltage of said error detecting circuit which appears at the terminals 124 and 126. The latter change in the output error signal or voltage of the error detecting circuit 40 which is applied to the input of the magnetic amplifier 140 causes a decrease in the output current or signal of the magnetic amplifier 140 which appears at the output terminals 142 and 144 and which is applied to the first and second control windings 94A and 94B of the saturable reactor 60 to thereby increase the effective reactance or impedance of the saturable reactor 60 and the output voltage of the frequency multiplier 20 across the load 100 until the latter voltage reaches substantially its regulated value.

When the load 100 is of a leading power factor type, the operation of the saturable reactor 60 because of the variation in the effective reactance or impedance of said reactor with the output voltage of the frequency multiplier 20 also cooperates with the fixed inductive reactor 96 in addition compensating for the leading power factor of the load 100 and in maintaining the effective power factor of the load 100 as viewed from the output of the frequency multiplier 20 within substantially a predetermined operating range.

It is to be understood that in certain applications a measure of the output voltage of the frequency multiplier 20 may be obtained by the use of a conventional potential transformer rather than by the use of a tap connection on the fixed inductive reactor 96 as illustrated in the drawing. It should also be understood that the magnetic amplifier 140 may be replaced in certain applications by other types of conventional amplifying devices, such as those of the electronic tube type or of the transistor type.

The apparatus embodying the teachings of this invention have several advantages. For example, it has been found that the efficiency of a frequency multiplying circuit as disclosed is improved over conventional frequency multipliers of the same general type while the voltage fluctuations at the output thereof are substantially eliminated. In addition, it has been found that the power factor of the overall frequency multipliers disclosed is considerably improved by the use of the different means described, particularly when the load connected to the output of the frequency multiplier is of the leading power factor type.

Since numerous changes may be made in the above-described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. A static frequency multiplier for converting alternating current having a predetermined frequency from a three-phase source to single phase alternating current having a frequency three times said predetermined frequency comprising a transformer means having three primary phase windings connected in circuit relation with said source and three secondary phase windings connected in series circuit relation with one another to provide a single phase alternating output current, inductive reactance means associated with and connected in series circuit relation with each of said primary windings between said source and said primary windings for limiting inrush currents when said primary windings are energized from said source, three-phase circuit means for at least partially compensating for the power factor of said transformer and reactance means, said circuit means being delta connected in phase-to-phase circuit relation between said source and said primary windings, the resonant frequency of said circuit means being slightly less than the fifth harmonic of said predetermined frequency, each phase of said circuit means comprising a capacitor and an inductive reactance connected in series circuit relationship, and reactance means connected in series circuit relation with each of the primary windings between the circuit means and the primary windings.

2. A static frequency multiplier for converting alternating current of a predetermined frequency from a three-phase source to single phase alternating current of a frequency three times said predetermined frequency comprising a transformer having three primary phase windings Y connected to said source and three secondary phase windings connected in series circuit relation with one another to provide a single phase alternating current output voltage thereacross and adapted to be connected to a load circuit, three-phase circuit means delta connected in phase-to-phase circuit relation between said primary windings and said source for compensating for the power factor of said transformer, each phase of said circuit means comprising a capacitor and an inductive reactance connected in series circuit relationship with one another, the resonant frequency of said circuit means being greater than three times and less than five times said predetermined frequency, reactance means connected in series circuit relation with each of the primary windings between the circuit means and the primary windings, and saturable reactor means connected in parallel circuit relation with the series circuit which includes said three secondary windings, said reactor means including a control winding adapted to be responsive to a control signal applied thereto for varying the voltage across said load and the effective power factor of said load.

3. A static frequency multiplier for converting alternating current of a predetermined frequency from a three-phase source to single phase alternating current of a frequency three times said predetermined frequency comprising a transformer having three primary phase windings Y connected to said source and three secondary phase windings connected in series circuit relation with one another to provide a single phase alternating current output voltage thereacross and adapted to be connected to a load circuit, three-phase circuit means delta connected in phase-to-phase circuit relation between said primary windings and said source for compensating for the power factor of said transformer, the resonant frequency of said circuit means being greater than three times said predetermined frequency, reactance means connected in series circuit relation with each of said primary windings between said circuit means and said primary windings for limiting the flow of harmonic currents between said circuit means and said primary windings, and saturable reactor means connected in parallel circuit relation with the series circuit which includes said three secondary windings, said reactor means including a control winding adapted to be responsive to a control signal applied thereto for varying the voltage across said load and the effective power factor of said load.

4. A regulator system for maintaining at substantially a predetermined value the output voltage of a static frequency multiplier adapted to convert alternating current of a predetermined frequency from a three-phase source to single phase alternating current of a frequency three times said predetermined frequency comprising a transformer having three primary phase windings Y connected to said source and three secondary windings connected in series with one another and adapted to provide a single phase alternating current output voltage to a load circuit connected thereacross, three-phase circuit means delta connected in phase-to-phase circuit relation between said primary windings and said source for compensating for the power factor of said transformer, the resonant frequency of said circuit means being greater than three times said predetermined frequency, reactance means connected in series circuit relation with each primary winding between the circuit means and the primary windings, a saturable inductive device having a load winding connected in parallel with said load circuit and a control winding, first means connected to said source for providing a substantially constant potential, second means for comparing the output voltage of said multiplier with said constant potential to obtain an error signal, and amplifying means connected in circuit relation between said second means and said control winding for applying a control signal thereto which varies with said error signal to vary the effective impedance of said saturable device and maintain the output voltage of said multiplier at substantially said predetermined value.

5. A regulator system for maintaining at substantially a predetermined value the output voltage of a static frequency multiplier adapted to convert alternating current of a predetermined frequency from a three-phase source to single phase alternating current of a frequency three times said predetermined frequency comprising a transformer having three primary phase windings Y connected to said source and three secondary windings connected in series with one another and adapted to provide a single phase alternating current output voltage to a load circuit connected thereacross, three-phase circuit means delta connected in phase-to-phase circuit relation between said primary windings and said source for compensating for the power factor of said transformer, each phase of said circuit means comprising a capacitor and an inductive reactance connected in series circuit relationship with one another, the resonant frequency of said circuit means being greater than three times said predetermined frequency, reactance means connected in series circuit relation with each primary winding between the circuit means and the primary windings, a saturable inductive device having a load winding connected in parallel with said load circuit and a control winding, first means connected to said source for providing a substantially constant potential, second means for comparing the output voltage of said multiplier with said constant potential to obtain an error signal, and amplifying means connected in circuit relation between said second means and said control winding for applying a control signal thereto which varies with said error signal to vary the effective impedance of said saturable device and maintain the output voltage of said multiplier substantially at said predetermined value.

6. A regulator system for maintaining at substantially a predetermined value the output voltage of a static frequency multiplier adapted to convert alternating current of a predetermined frequency from a three-phase source to single phase alternating current of a frequency three times said predetermined frequency comprising a transformer having three primary phase windings Y connected to said source and three secondary windings connected in series with one another and adapted to provide a single phase alternating current output voltage to a load circuit connected thereacross, three-phase circuit means delta connected in phase-to-phase circuit relation between said primary windings and said source for compensating for the power factor of said transformer, the resonant frequency of said circuit means being greater than three times said predetermined frequency, inductive reactance means connected in series circuit relation with each of said primary windings between said circuit means and said primary windings for limiting the flow of harmonic currents between said circuit means and said primary windings, a saturable inductive device having a load winding connected in parallel with said load circuit and a control winding, first means connected to said source for providing a substantially constant potential, second means for comparing the output voltage of said multiplier with said constant potential to obtain an error signal, and amplifying means connected in circuit relation between said second means and said control winding for applying a control signal thereto which varies with said error signal to vary the effective impedance of said saturable device and maintain the output voltage of said multiplier substantially at said predetermined value.

References Cited in the file of this patent

UNITED STATES PATENTS

| | | |
|---|---|---|
| 1,157,730 | Spinelli | Oct. 26, 1915 |
| 1,991,063 | Rudenberg | Feb. 12, 1935 |
| 2,166,827 | Stacy | July 18, 1939 |
| 2,380,522 | Haug | July 21, 1945 |
| 2,451,189 | Alexanderson et al. | Oct. 12, 1948 |
| 2,517,396 | Logan | Aug. 1, 1950 |
| 2,682,635 | Henrich | June 29, 1954 |
| 2,693,540 | Huge | Nov. 2, 1954 |
| 2,820,942 | Depenbrock | Jan. 21, 1958 |
| 2,824,274 | Holt | Feb. 18, 1958 |
| 2,978,629 | Siedband | Apr. 14, 1961 |

FOREIGN PATENTS

| | | |
|---|---|---|
| 538,651 | France | Mar. 22, 1922 |
| 470,351 | Great Britain | Aug. 13, 1937 |
| 1,015,126 | Germany | Sept. 5, 1957 |